(12) United States Patent
Underhill (10) Patent No.: US 11,608,908 B2
(45) Date of Patent: Mar. 21, 2023

(54) EXTENDER

(71) Applicant: UNDERHILL INTERNATIONAL CORPORATION, Irving, CA (US)

(72) Inventor: Edward Underhill, Mission Viejo, CA (US)

(*) Notice: Subject to any disclaimer, the term of this patent is extended or adjusted under 35 U.S.C. 154(b) by 0 days.

(21) Appl. No.: 17/120,130

(22) Filed: Dec. 12, 2020

(65) Prior Publication Data
US 2022/0120359 A1 Apr. 21, 2022

Related U.S. Application Data

(60) Provisional application No. 63/092,063, filed on Oct. 15, 2020.

(51) Int. Cl.
*F16L 15/00* (2006.01)
*F16K 31/60* (2006.01)

(52) U.S. Cl.
CPC .................. *F16K 31/607* (2013.01)

(58) Field of Classification Search
CPC ....... F16L 15/002; F16L 15/007; F16L 15/08; F16K 31/60
USPC ............................................ 285/38, 355, 390
See application file for complete search history.

(56) References Cited

U.S. PATENT DOCUMENTS

2012/0111420 A1* 5/2012 Bisio .................. F16K 31/607
137/15.18
2018/0231141 A1* 8/2018 Feng ..................... F16K 31/60

* cited by examiner

*Primary Examiner* — Paul J Gray
(74) *Attorney, Agent, or Firm* — Michael A. Blake

(57) ABSTRACT

The present invention provides an extension member for coupling with a quick coupler key. The extension member includes: a first member; a second member; a handle; and a third member. Methods of using the extension member for coupling with a pipe and a quick coupler key, which is coupled to a quick coupler assembly are also provided.

5 Claims, 9 Drawing Sheets

Prior Art

*FIG. 1*

Prior Art

EXTENDER

RELATED APPLICATIONS

This application claims priority to U.S. Provisional Patent Application Ser. No. 63/092,063 filed Oct. 15, 2020, which is hereby incorporated by reference in its entirety for all purposes.

BACKGROUND OF THE INVENTION

The present application relates to an extending member that engages a quick coupler key that is used to engage quick coupler assembly in an underground water system.

In underground water supply systems, for example, for irrigating golf courses, a vertical distribution supply pipe extends vertically below-ground and is coupled at its lower end to a main water distribution pipe. The opposite end of the vertically disposed distribution pipe is coupled with quick coupler assembly that is at ground level and includes a quick connect valve. The quick connect valve has a cap and a cover. To open the valve to supply water to an above-ground distribution conduit, for example, a hose, the cover is removed and the valve cap is pivoted out of the way. A quick coupler key is inserted axially into the exposed valve. Upon rotation of the quick coupler key relative to the valve about the vertical axis, the interior mechanism of the valve opens to supply water to the above-ground conduit. Similarly, rotation of the quick coupler key in the opposite rotational direction closes the valve. Over time and depending upon the soil composition, the underground water distribution pipe can sink lower into the ground. If the underground water distribution pipe sinks far enough into the ground, the sunken hole containing the quick coupler assembly will interfere with the user to turn the handle on the quick coupler key. As such, the vertically disposed distribution pipe must be replaced with a longer distribution pipe to bring the quick coupler assembly flush with the ground level.

What is needed is an extending member that engages a quick coupler key to engage the sunken quick coupler assembly in an underground water system.

SUMMARY OF THE INVENTION

The present invention provides an extension member for coupling with a quick coupler key. The extension member includes: a first member; a second member; a handle; and a third member. Methods of using the extension member for coupling with a pipe and a quick coupler key, which is coupled to a quick coupler assembly are also provided.

The present invention provides an extending member for engaging a quick coupler assembly that has sunken far into the ground thereby preventing the use of a typical quick coupler key because the user cannot rotate the handle of the quick coupler key without interference from the surrounding ground. This extending member allows for a sunken quick coupler assembly to continued being used and avoids the costly process of digging up and repositioning the quick coupler assembly and associated water supply pipes.

The present invention provides an extension member for coupling with a pipe and a quick coupler key. The extension member includes: a first member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second member having a first end, a second end, a first surface, a second surface, and a second interior diameter, wherein the first end of the second member is adjacent to the second end of the first member; a handle coupled to the second surface of the second member; a third member having a first end, a second end, a third female thread, and a third interior diameter, wherein the first end of the third member is adjacent to the second end of the second member; and wherein the third female thread is configured to accept a third male thread on a quick coupler key.

In one embodiment, the handle is directly coupled to the second surface of the second member. In one embodiment, the handle is detachably coupled to the second surface of the second member. In one embodiment, the second surface of the second member includes a fourth female thread. In one embodiment, the handle has a proximal end and a distal end, wherein the distal end includes a fourth male thread. In one embodiment, the fourth female thread of the second surface of the second member is detachably coupled to the fourth male thread on the distal end of the handle. In one embodiment, the first interior diameter is greater than the second interior diameter, and wherein the second interior diameter is less than the third interior diameter.

The present invention provides an extension member for coupling with a pipe and a quick coupler key. The extension member includes: a first member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second member having a first end, a second end, a first surface, a second surface, and a second interior diameter, wherein the first end of the second member is adjacent to the second end of the first member; a handle directly coupled to the second surface of the second member; a third member having a first end, a second end, a third female thread, and a third interior diameter, wherein the first end of the third member is adjacent to the second end of the second member; and wherein the third female thread is configured to accept a third male thread on a quick coupler key.

In one embodiment, the first interior diameter is greater than the second interior diameter, and wherein the second interior diameter is less than the third interior diameter.

The present invention provides an extension member for coupling with a pipe and a quick coupler key. The extension member includes: a first member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second member having a first end, a second end, a first surface, a second surface, and a second interior diameter, wherein the first end of the second member is adjacent to the second end of the first member; a handle detachable coupled to the second surface of the second member; a third member having a first end, a second end, a third female thread, and a third interior diameter, wherein the first end of the third member is adjacent to the second end of the second member; and wherein the third female thread is configured to accept a third male thread on a quick coupler key.

In one embodiment, the handle has a proximal end and a distal end, wherein the distal end includes a fourth male thread. In one embodiment, the fourth female thread of the second surface of the second member is detachably coupled to the fourth male thread on the distal end of the handle. In one embodiment, the first interior diameter is greater than the second interior diameter. In one embodiment, the second interior diameter is less than the third interior diameter. In one embodiment, the first interior diameter is greater than the second interior diameter, and wherein the second interior diameter is less than the third interior diameter.

The present invention provides an extension member for coupling with a pipe and a quick coupler key. The extension member includes: a first cylindrical member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second cylindrical member having a first end, a second end, a first surface, a second surface, and a second interior diameter, wherein the first end of the second cylindrical member is adjacent to the second end of the first cylindrical member; a handle coupled to the second surface of the second cylindrical member; a third cylindrical member having a first end, a second end, a third female thread, and a third interior diameter, wherein the first end of the third cylindrical member is adjacent to the second end of the second cylindrical member; and wherein the third female thread is configured to accept a third male thread on a quick coupler key.

In one embodiment, the handle is directly coupled to the second surface of the second cylindrical member. In one embodiment, the handle is detachably coupled to the second surface of the second cylindrical member. In one embodiment, the second surface of the second cylindrical member includes a fourth female thread. In one embodiment, the handle has a proximal end and a distal end, wherein the distal end includes a fourth male thread. In one embodiment, the fourth female thread of the second surface of the second cylindrical member is detachably coupled to the fourth male thread on the distal end of the handle. In one embodiment, the first interior diameter is greater than the second interior diameter, and wherein the second interior diameter is less than the third interior diameter.

The present invention provides an extension member for coupling with a pipe and a quick coupler key. The extension member includes: a first cylindrical member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second cylindrical member having a first end, a second end, a first surface, a second surface, and a second interior diameter, wherein the first end of the second cylindrical member is adjacent to the second end of the first cylindrical member; a handle directly coupled to the second surface of the second cylindrical member; a third cylindrical member having a first end, a second end, a third female thread, and a third interior diameter, wherein the first end of the third cylindrical member is adjacent to the second end of the second cylindrical member; and wherein the third female thread is configured to accept a third male thread on a quick coupler key.

In one embodiment, the first interior diameter is greater than the second interior diameter, and wherein the second interior diameter is less than the third interior diameter.

The present invention provides an extension member for coupling with a pipe and a quick coupler key. The extension member includes: a first cylindrical member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second cylindrical member having a first end, a second end, a first surface, a second surface, and a second interior diameter, wherein the first end of the second cylindrical member is adjacent to the second end of the first cylindrical member; a handle detachable coupled to the second surface of the second cylindrical member; a third cylindrical member having a first end, a second end, a third female thread, and a third interior diameter, wherein the first end of the third cylindrical member is adjacent to the second end of the second cylindrical member; and wherein the third female thread is configured to accept a third male thread on a quick coupler key.

In one embodiment, the handle has a proximal end and a distal end, wherein the distal end includes a fourth male thread. In one embodiment, the fourth female thread of the second surface of the second cylindrical member is detachably coupled to the fourth male thread on the distal end of the handle. In one embodiment, the first interior diameter is greater than the second interior diameter. In one embodiment, the second interior diameter is less than the third interior diameter. In one embodiment, the first interior diameter is greater than the second interior diameter, and wherein the second interior diameter is less than the third interior diameter.

The present invention provides an extension member for coupling with a pipe and a quick coupler key. The extension member includes: a housing unit having a proximal end, a distal end, a first surface, a second surface and an axis, wherein the proximal end includes a first male thread, wherein the distal end includes a first female thread, a handle having a proximal end and a distal end, wherein the proximal end of the handle is operatively coupled to the first surface of the housing unit between the first male thread and the first female thread of the housing unit, and wherein the first female thread of the extension member is inserted by a user into a male thread of a quick couple key to enable the user to engage the quick coupler key into a quick coupler assembly.

In one embodiment, the housing unit is cylindrical. In one embodiment, the proximal end of the handle is directly coupled to the first surface of the housing unit between the first male thread and the first female thread of the housing unit. In one embodiment, the proximal end of the handle is detachably coupled to the first surface of the housing unit between the first male thread and the first female thread of the housing unit. In one embodiment, the first surface of the unit includes a second female thread. In one embodiment, the proximal end of the handle includes a second male thread. In one embodiment, the second male thread of the handle is detachably coupled to the second female thread on the first surface of the housing unit.

The present invention provides an extension member for coupling with a pipe and a quick coupler key. The extension member includes: a housing unit having a proximal end, a distal end, a first surface, a second surface and an axis, wherein the proximal end includes a first male thread, wherein the distal end includes a first female thread; a handle having a proximal end and a distal end, wherein the proximal end of the handle is directly coupled to the first surface of the housing unit between the first male thread and the first female thread of the housing unit, and wherein the first female thread of the extension member is inserted by a user into a male thread of a quick couple key to enable the user to engage the quick coupler key into a quick coupler assembly.

In one embodiment, the housing unit is cylindrical.

The present invention provides an extension member for coupling with a pipe and a quick coupler key. The extension member includes: a housing unit having a proximal end, a distal end, a first surface, a second surface and an axis, wherein the proximal end includes a first male thread, wherein the distal end includes a first female thread; a handle having a proximal end and a distal end, wherein the proximal end of the handle is detachably coupled to the first surface of the housing unit between the first male thread and the first female thread of the housing unit, and wherein the first female thread of the extension member is inserted by a user into a male thread of a quick couple key to enable the user to engage the quick coupler key into a quick coupler assembly.

In one embodiment, the housing unit is cylindrical. In one embodiment, the first surface of the unit includes a second female thread. In one embodiment, the proximal end of the handle includes a second male thread. In one embodiment, the second male thread of the handle is detachably coupled to the second female thread on the first surface of the housing unit.

The present invention provides an extension member for coupling with a pipe and a quick coupler key. The extension member includes: a housing unit having a proximal end, a distal end, a first surface, a second surface and an axis, wherein the proximal end includes a first male thread, wherein the distal end includes a first female thread, wherein the first surface of the unit includes a second female thread; a handle having a proximal end and a distal end, wherein the proximal end of the handle includes a second male thread, wherein the second male thread of the handle is detachably coupled to the second female thread on the first surface of the housing unit between the first male thread and the first female thread of the housing unit, and wherein the first female thread of the extension member is inserted by a user into a male thread of a quick couple key to enable the user to engage the quick coupler key into a quick coupler assembly.

In one embodiment, the housing unit is cylindrical.

The present invention provides an extension member for coupling with a pipe and a quick coupler key. The extension member includes: a cylindrical housing unit having a proximal end, a distal end, a first surface, a second surface and an axis, wherein the proximal end includes a first male thread, wherein the distal end includes a first female thread, a handle having a proximal end and a distal end, wherein the proximal end of the handle is operatively coupled to the first surface of the cylindrical housing unit between the first male thread and the first female thread of the cylindrical housing unit, and wherein the first female thread of the extension member is inserted by a user into a male thread of a quick couple key to enable the user to engage the quick coupler key into a quick coupler assembly.

In one embodiment, the cylindrical housing unit is cylindrical. In one embodiment, the proximal end of the handle is directly coupled to the first surface of the cylindrical housing unit between the first male thread and the first female thread of the cylindrical housing unit. In one embodiment, the proximal end of the handle is detachably coupled to the first surface of the cylindrical housing unit between the first male thread and the first female thread of the cylindrical housing unit. In one embodiment, the first surface of the unit includes a second female thread. In one embodiment, the proximal end of the handle includes a second male thread. In one embodiment, the second male thread of the handle is detachably coupled to the second female thread on the first surface of the cylindrical housing unit.

The present invention provides an extension member for coupling with a pipe and a quick coupler key. The extension member includes: a cylindrical housing unit having a proximal end, a distal end, a first surface, a second surface and an axis, wherein the proximal end includes a first male thread, wherein the distal end includes a first female thread, a handle having a proximal end and a distal end, wherein the proximal end of the handle is directly coupled to the first surface of the cylindrical housing unit between the first male thread and the first female thread of the cylindrical housing unit, and wherein the first female thread of the extension member is inserted by a user into a male thread of a quick couple key to enable the user to engage the quick coupler key into a quick coupler assembly.

The present invention provides an extension member for coupling with a pipe and a quick coupler key. The extension member includes: a cylindrical housing unit having a proximal end, a distal end, a first surface, a second surface and an axis, wherein the proximal end includes a first male thread, wherein the distal end includes a first female thread; a handle having a proximal end and a distal end, wherein the proximal end of the handle is detachably coupled to the first surface of the cylindrical housing unit between the first male thread and the first female thread of the cylindrical housing unit, and wherein the first female thread of the extension member is inserted by a user into a male thread of a quick couple key to enable the user to engage the quick coupler key into a quick coupler assembly.

In one embodiment, the cylindrical housing unit is cylindrical. In one embodiment, the first surface of the unit includes a second female thread. In one embodiment, the proximal end of the handle includes a second male thread. In one embodiment, the second male thread of the handle is detachably coupled to the second female thread on the first surface of the cylindrical housing unit.

The present invention provides an extension member for coupling with a pipe and a quick coupler key. The extension member includes: a cylindrical housing unit having a proximal end, a distal end, a first surface, a second surface and an axis, wherein the proximal end includes a first male thread, wherein the distal end includes a first female thread, wherein the first surface of the unit includes a second female thread; a handle having a proximal end and a distal end, wherein the proximal end of the handle includes a second male thread, wherein the second male thread of the handle is detachably coupled to the second female thread on the first surface of the cylindrical housing unit between the first male thread and the first female thread of the cylindrical housing unit, and wherein the first female thread of the extension member is inserted by a user into a male thread of a quick couple key to enable the user to engage the quick coupler key into a quick coupler assembly.

The present invention also provides a method of using an extension member for coupling with a pipe and a quick coupler key, which is coupled to a quick coupler assembly. The method includes: providing an extension member for coupling with a quick coupler key, the extension member including: a first member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second member having a first end, a second end, a first surface, a second surface, and a second interior diameter, wherein the first end of the second member is adjacent to the second end of the first member; a handle coupled to the second surface of the second member; a third member having a first end, a second end, a third female thread, and a third interior diameter, wherein the first end of the third member is adjacent to the second end of the second member; and wherein the third female thread is configured to accept a third male thread on a quick coupler key; connecting the first female thread to the second male thread on a pipe; connecting the first male thread to a second female thread on a pipe coupler; connecting the third female thread to a third male thread on the quick coupler key; connecting the quick coupler connector on the quick coupler key to a quick coupler assembly; removing the quick coupler key handle; and rotating the handle on the extension member to lock the quick coupler key to the quick coupler assembly.

The present invention also provides a method of using an extension member for coupling with a pipe and a quick coupler key, which is coupled to a quick coupler assembly. The method includes: providing an extension member for coupling with a quick coupler key, the extension member including: a first member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second member having a first end, a second end, a first surface, a second surface, and a second interior diameter, wherein the first end of the second member is adjacent to the second end of the first member; a handle directly coupled to the second surface of the second member; a third member having a first end, a second end, a third female thread, and a third interior diameter, wherein the first end of the third member is adjacent to the second end of the second member; and wherein the third female thread is configured to accept a third male thread on a quick coupler key; connecting the first female thread to the second male thread on a pipe; connecting the first male thread to a second female thread on a pipe coupler; connecting the third female thread to a third male thread on the quick coupler key; connecting the quick coupler connector on the quick coupler key to a quick coupler assembly; removing the quick coupler key handle; and rotating the handle on the extension member to lock the quick coupler key to the quick coupler assembly.

The present invention also provides a method of using an extension member for coupling with a pipe and a quick coupler key, which is coupled to a quick coupler assembly. The method includes; providing an extension member for coupling with a quick coupler key, the extension member including: a first cylindrical member having a first end, a second end, a first male thread, and a first female thread, a first interior diameter, and an axis, wherein the first male thread is configured to accept a second female thread on a pipe coupler, wherein the first female thread is configured to accept a second male thread on a pipe; a second cylindrical member having a first end, a second end, a first surface, a second surface, and a second interior diameter, wherein the first end of the second cylindrical member is adjacent to the second end of the first cylindrical member; a handle directly coupled to the second surface of the second cylindrical member; a third cylindrical member having a first end, a second end, a third female thread, and a third interior diameter, wherein the first end of the third cylindrical member is adjacent to the second end of the second cylindrical member, wherein the third female thread is configured to accept a third male thread on a quick coupler key, wherein the first interior diameter is greater than the second interior diameter, and wherein the second interior diameter is less than the third interior diameter; connecting the first female thread to the second male thread on a pipe; connecting the first male thread to a second female thread on a pipe coupler; connecting the third female thread to a third male thread on the quick coupler key; connecting the quick coupler connector on the quick coupler key to a quick coupler assembly; removing the quick coupler key handle; and rotating the handle on the extension member to lock the quick coupler key to the quick coupler assembly.

BRIEF DESCRIPTION OF THE DRAWINGS

Embodiments of the invention may be best understood by referring to the following description and accompanying drawings, which illustrate such embodiments. In the drawings.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides an extension member for coupling with a quick coupler key. The extension member includes: a first member; a second member; a handle; and a third member. Methods of using the extension member for coupling with a pipe and a quick coupler key, which is coupled to a quick coupler assembly are also provided.

The present invention provides an extending member for engaging a quick coupler assembly that has sunken far into the ground thereby preventing the use of a typical quick coupler key because the user cannot rotate the handle of the quick coupler key without interference from the surrounding ground. This extending member allows for a sunken quick coupler assembly to continued being used and avoids the costly process of digging up and repositioning the quick coupler assembly and associated water supply pipes.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the phrase "detachably coupled" means the joining of two members to one another with a linkage that can easily be easily undone. For example, suitable detachably couplings include a threaded joint, a ball and socket, As used herein, the term "detachable" refers to a connection that may be established or removed using no tools or minimal tools (e.g., screwdriver, Allen wrench, etc.)

As used herein, the term "extender" refers to an extending member that engages a quick coupler key.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "operatively coupled" refers to bringing two or more items together or into relationship with each other such that they may operate together or allow transfer of information between the two or more items.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Figure 1:
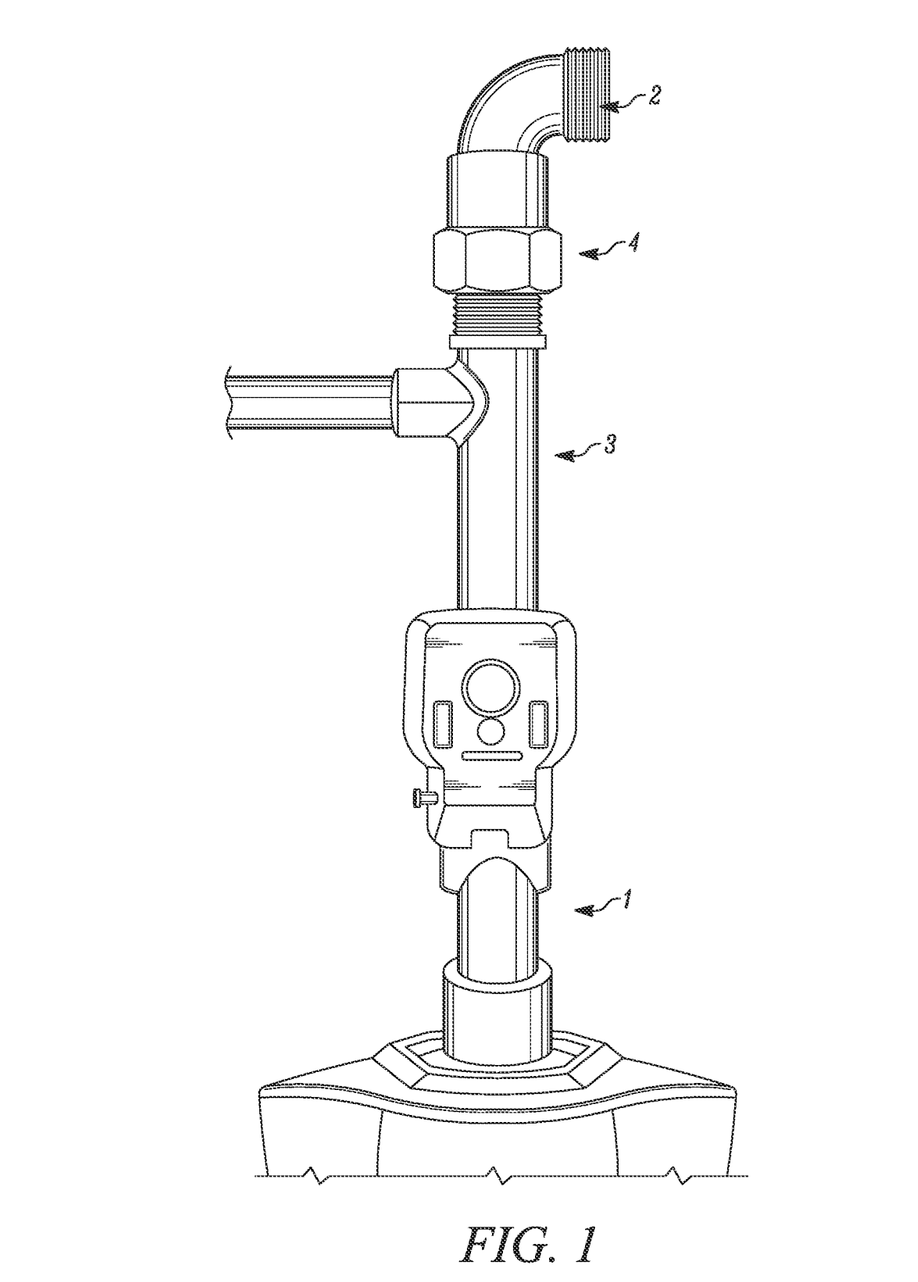
FIG. 1 is a front-view drawing illustrating the prior art quick coupler key connected to a quick coupler assembly and a pipe.

FIG. 1 is a front-view drawing illustrating the prior art quick coupler key connected to a quick coupler assembly and a pipe, which allows a user to access an underground water supply (not shown) for a mobile above the ground sprinkler (not shown). A quick coupler assembly 1 is buried at the surface of the ground (not shown) and connected to the underground water supply. To access the underground water supply, a user typically connects a pipe 2 to the quick coupler key 3, tightens the pipe coupler 4, inserts the quick coupler key 3 into the quick coupler assembly 1, and rotates the quick coupler key 3 to lock it into the quick coupler assembly 1.

Figure 2:
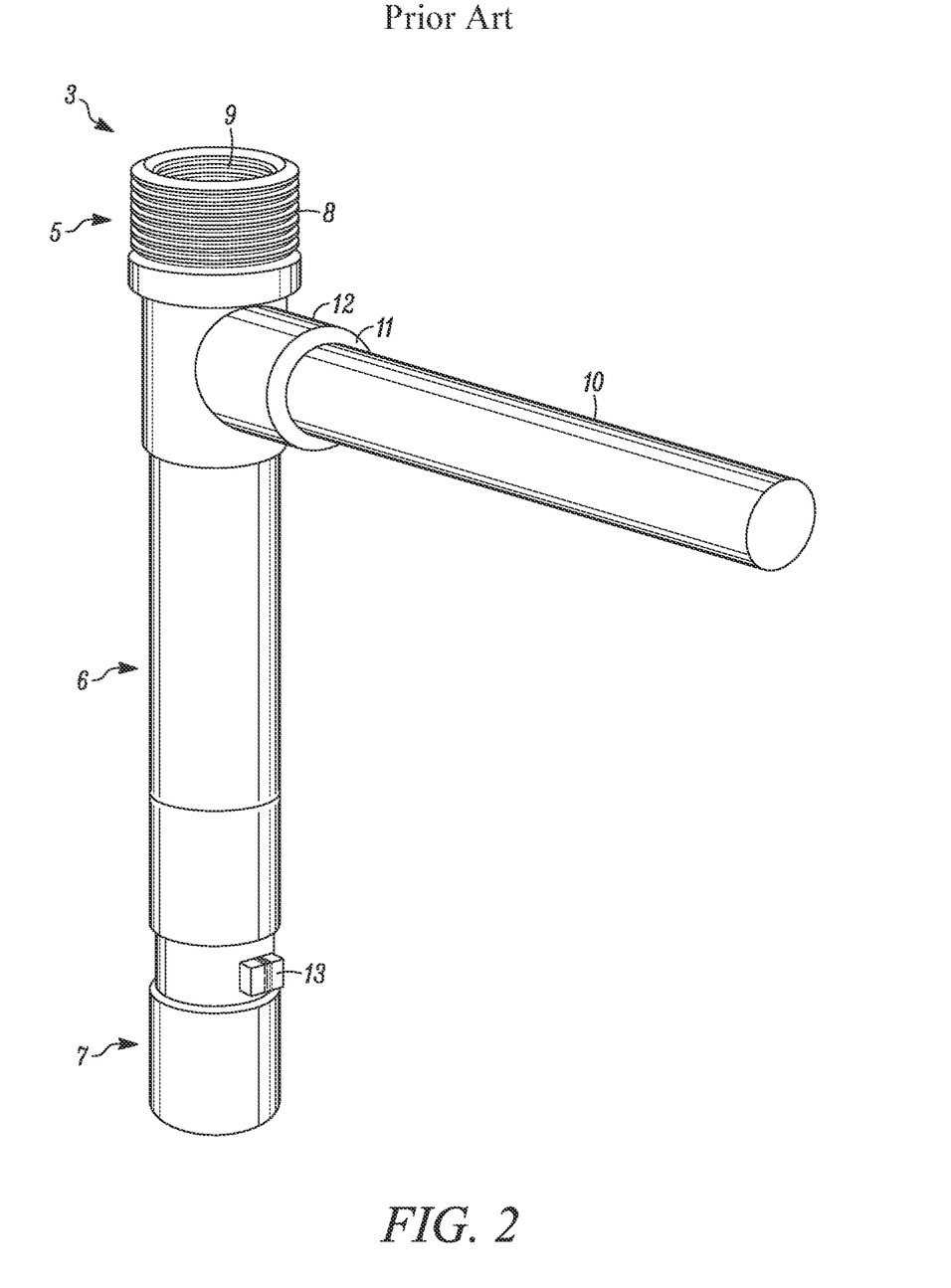
FIG. 2 is a perspective-view drawing illustrating the prior art quick coupler key.

FIG. 2 is a perspective-view drawing illustrating a prior art quick coupler key. The quick coupler key 3 includes three parts; a proximal end 5, a main housing 6, and a distal end 7. The proximal end 5 includes a male thread 8 and a female thread 9. The female thread 9 is configured to connect with a male thread (not shown) on the pipe 2 in FIG. 1. The male thread 8 is configured to connect with a female thread (not shown) in the pipe coupler 4 in FIG. 1. The main housing 6 includes a handle 10 having a proximal end and a distal end. The distal end of the handle 10 has a male thread 11 that connects with a female thread 12 in the main housing 6. The distal end 7 includes a male quick coupler fitting 13. The user inserts the male quick coupler fitting 13 into a female quick couple fitting (not shown) on the top of the quick coupler assembly 1 in FIG. 1, and rotates the quick couple key 3 with the handle 10 to secure a water tight connection to the quick coupler assembly 1. When the quick coupler assembly 1 settles into a deep hole in the ground with time, it becomes difficult for the user to rotate the handle 10 without interference from the surrounding ground.

Figure 3:
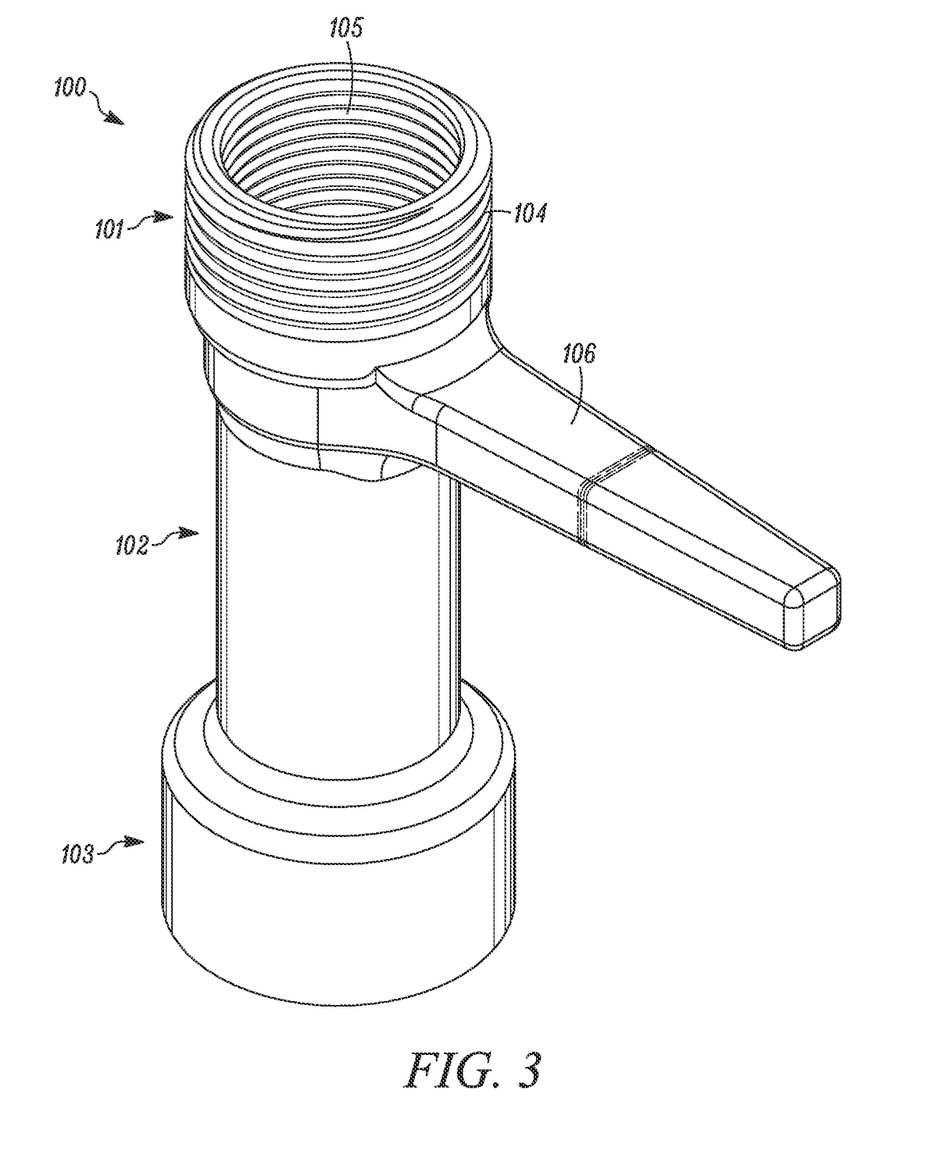
FIG. 3 is a perspective-view drawing illustrating an exemplary extension member for coupling with a quick coupler key.

FIG. 3 is a perspective-view drawing illustrating an exemplary extension member for coupling with a quick coupler key. The extension member 100 includes a first member 101, a second member 102, and a third member 103. The first member 101 has a first male thread 104 and a first female thread 105. The first male thread 104 is configured to accept a female thread (not shown) on a pipe coupler 4 in FIG. 1. The first female thread 105 is configured to accept a second male thread (not shown) on a pipe 2 in FIG. 1. The second member 102 is adjacent to the second end of the first member 101. The handle 106 is directly coupled to the second surface of the second member 102. The third member 103 has a first end, a second end, and a third female thread (not shown). The first end of the third member 103 is adjacent to the second end of the second member 102. The third female thread (not shown) is configured to accept a male thread 8 on a quick coupler key 3 in FIG. 2.

Figure 4:
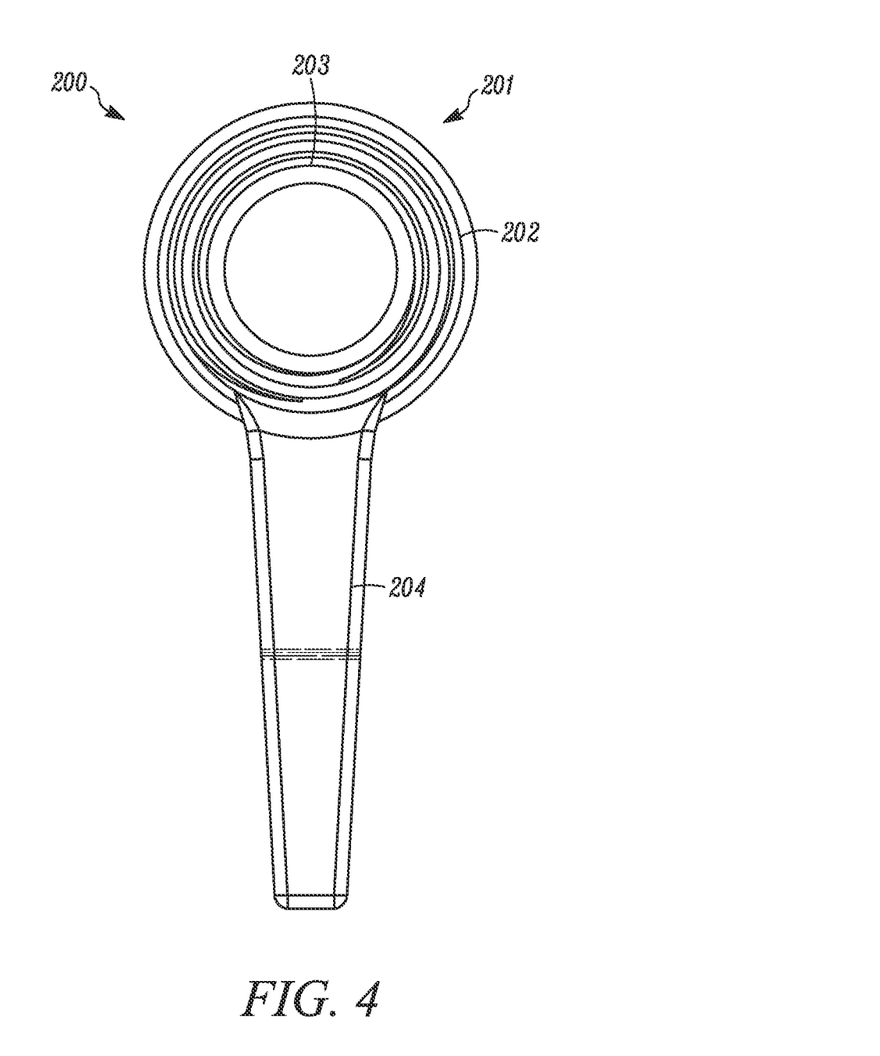
FIG. 4 is a top-view drawing illustrating an exemplary extension member for coupling with a quick coupler key.

FIG. 4 is a top-view drawing illustrating an exemplary extension member for coupling with a quick coupler key. The extension member 200 includes a first member 201, a second member (not shown), and a third member (not shown). The first member 201 has a first male thread 202 and a first female thread 203. The first male thread 202 is configured to accept a female thread (not shown) on a pipe coupler 4 in FIG. 1. The first female thread 203 is configured to accept a male thread (not shown) on a pipe 2 in FIG. 1. The handle 204 is directly coupled to the second surface of the second member (not shown).

Figure 5:
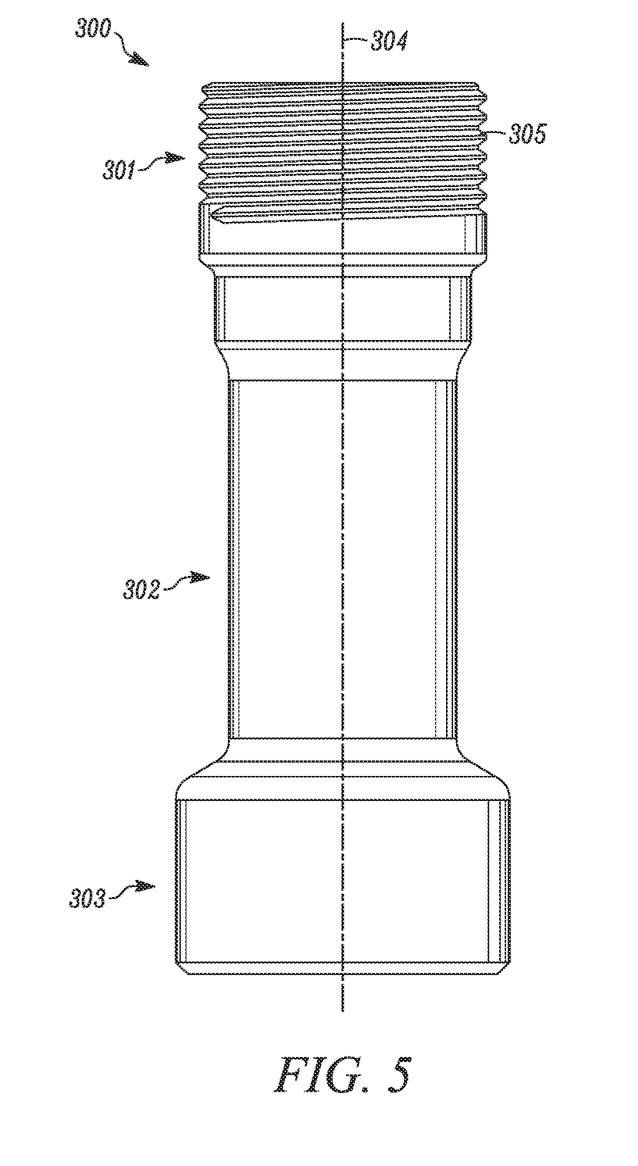
FIG. 5 is a left-view drawing illustrating an exemplary extension member for coupling with a quick coupler key.

FIG. 5 is a left-view drawing illustrating an exemplary extension member for coupling with a quick coupler key. The extension member 300 includes a first member 301, a second member 302, a third member 303, and an axis 304. The first member 301 has a first male thread 305 and a first female thread (not shown). The first end of the second member 302 is adjacent to the second end of the first member 301. The first end of the third member 303 is adjacent to the second end of the second member 302.

Figure 6:
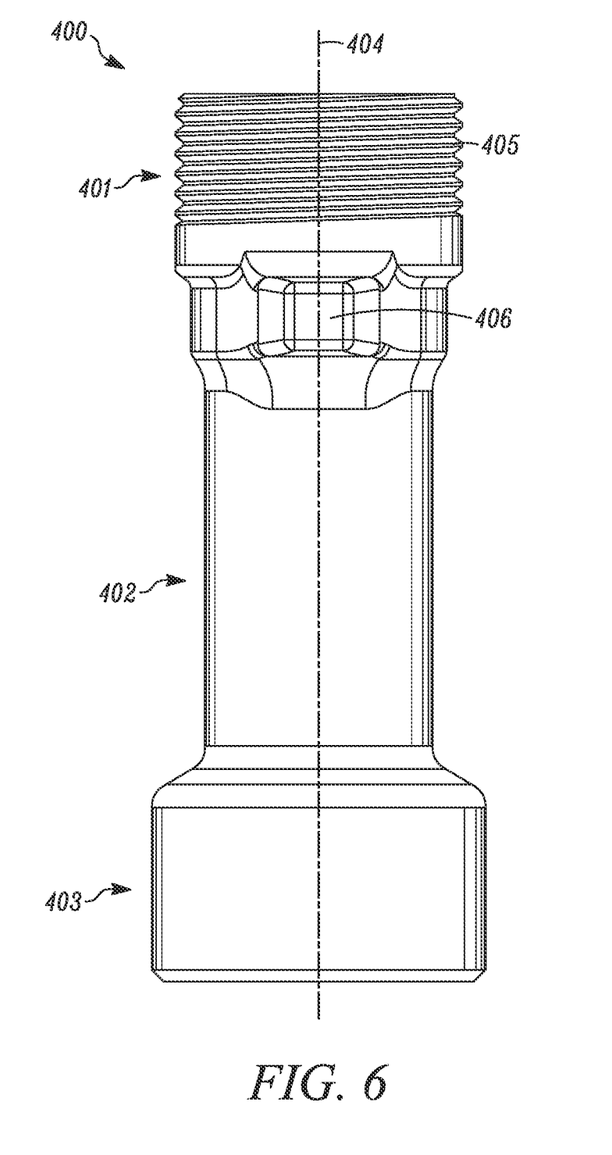
FIG. 6 is a right-view drawing illustrating an exemplary extension member for coupling with a quick coupler key.

FIG. 6 is a right-view drawing illustrating an exemplary extension member for coupling with a quick coupler key. The extension member 400 includes a first member 401, a second member 402, a third member 403, an axis 404, a first male thread 405, and a handle 406. The first member 401 has a first male thread 405 and a first female thread (not shown). The handle 406 is directly coupled to the second surface of the second member 402. The first end of the second member 402 is adjacent to the second end of the first member 401. The first end of the third member 403 is adjacent to the second end of the second member 402.

Figure 7:
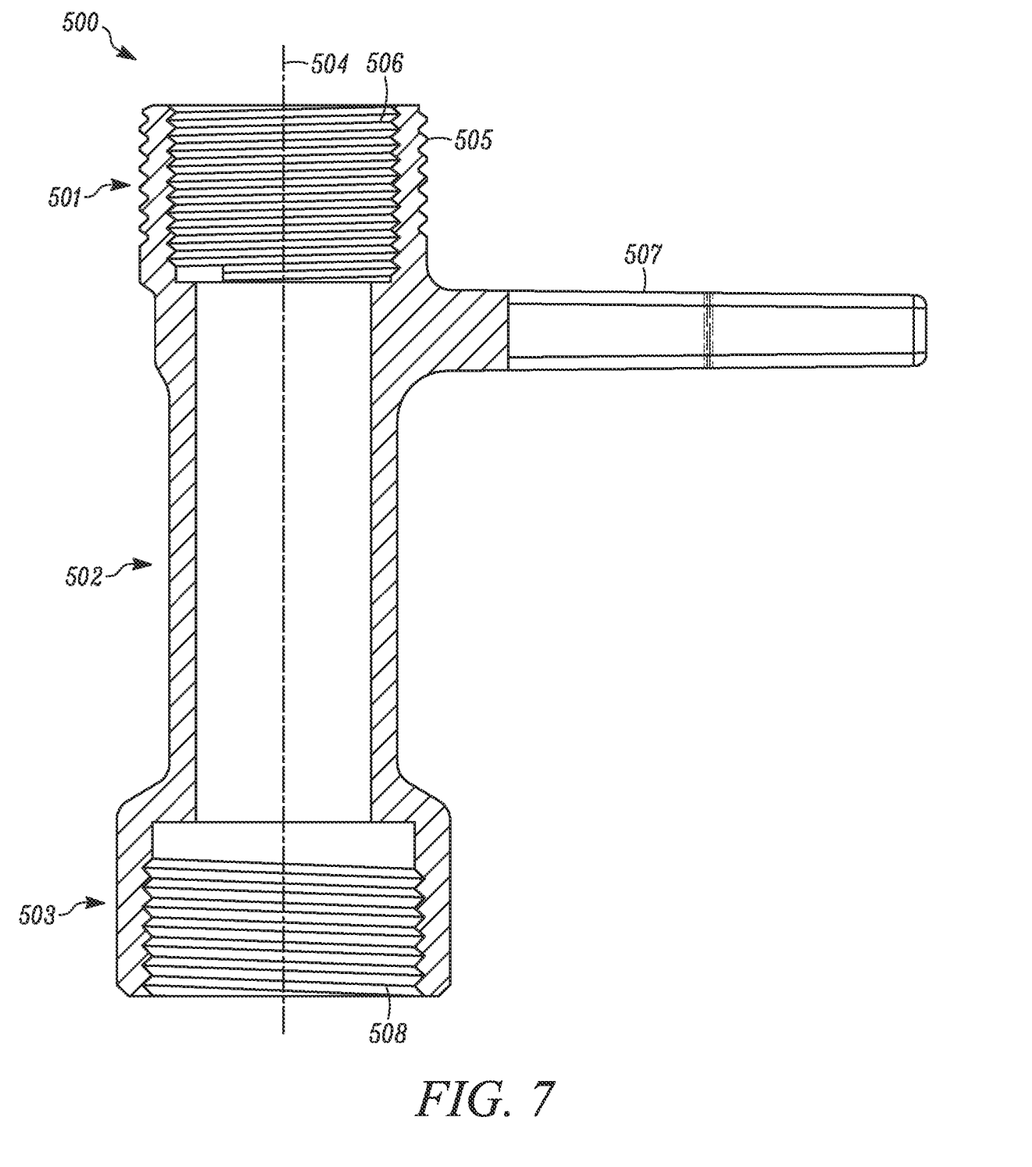
FIG. 7 is a side-cut away view drawing illustrating an exemplary extension member for coupling with a quick coupler key.

FIG. 7 is a side-cut away view drawing illustrating an exemplary extension member for coupling with a quick coupler key. The extension member 500 includes a first member 501, a second member 502, a third member 503, and an axis 704. The first member 501 has a first male thread 505 and a first female thread 506. The first male thread 505 is configured to accept a female thread (not shown) on a pipe coupler 4 in FIG. 1. The first female thread 506 is configured to accept a second male thread (not shown) on a pipe 2 in FIG. 1. The second member 502 is adjacent to the second end of the first member 501. The handle 507 is directly coupled to the second surface of the second member 502. The third member 503 has a first end, a second end, and a third female thread 508. The first end of the third member 503 is adjacent to the second end of the second member 502. The third female thread 508 is configured to accept a male thread 8 on a quick coupler key 3 in FIG. 2. The first interior diameter of the first member 501 is greater than the second interior diameter of the second member 502. The second interior diameter of the second member 502 is less than the third interior diameter of the third member 503.

Figure 8:
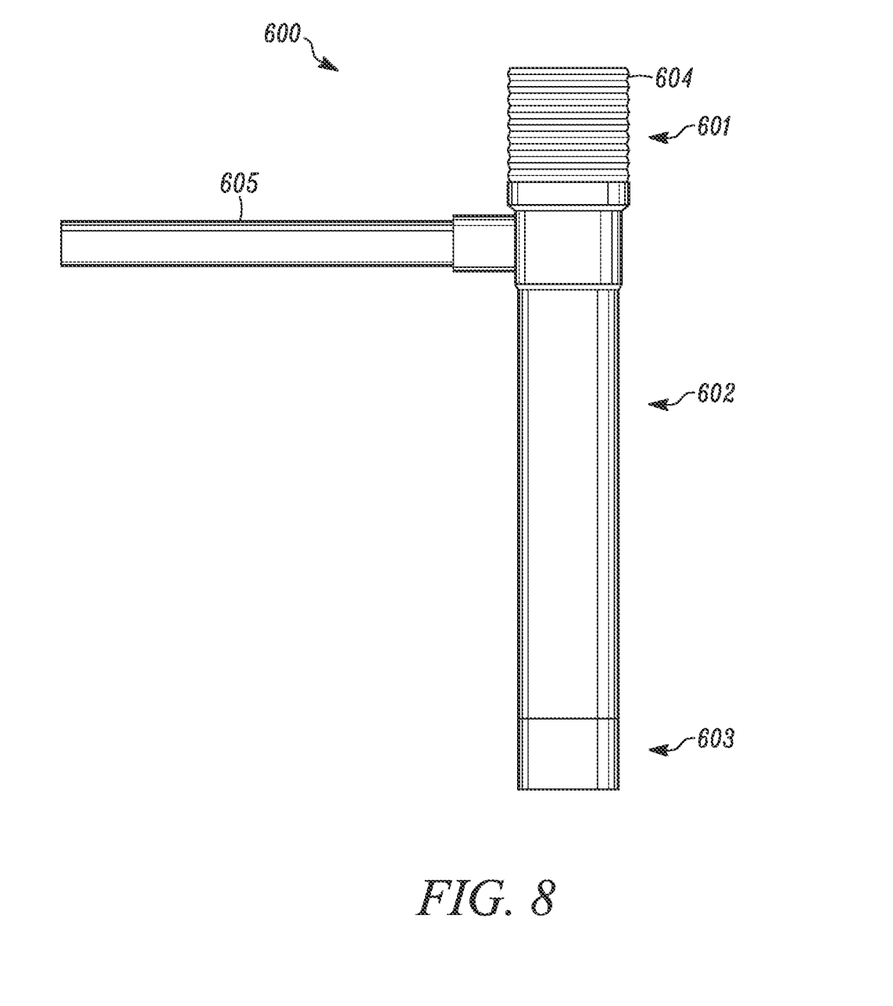
FIG. 8 is a side-view drawing illustrating an exemplary extension member with a detachable handle for coupling with a quick coupler key.
Figure 9:
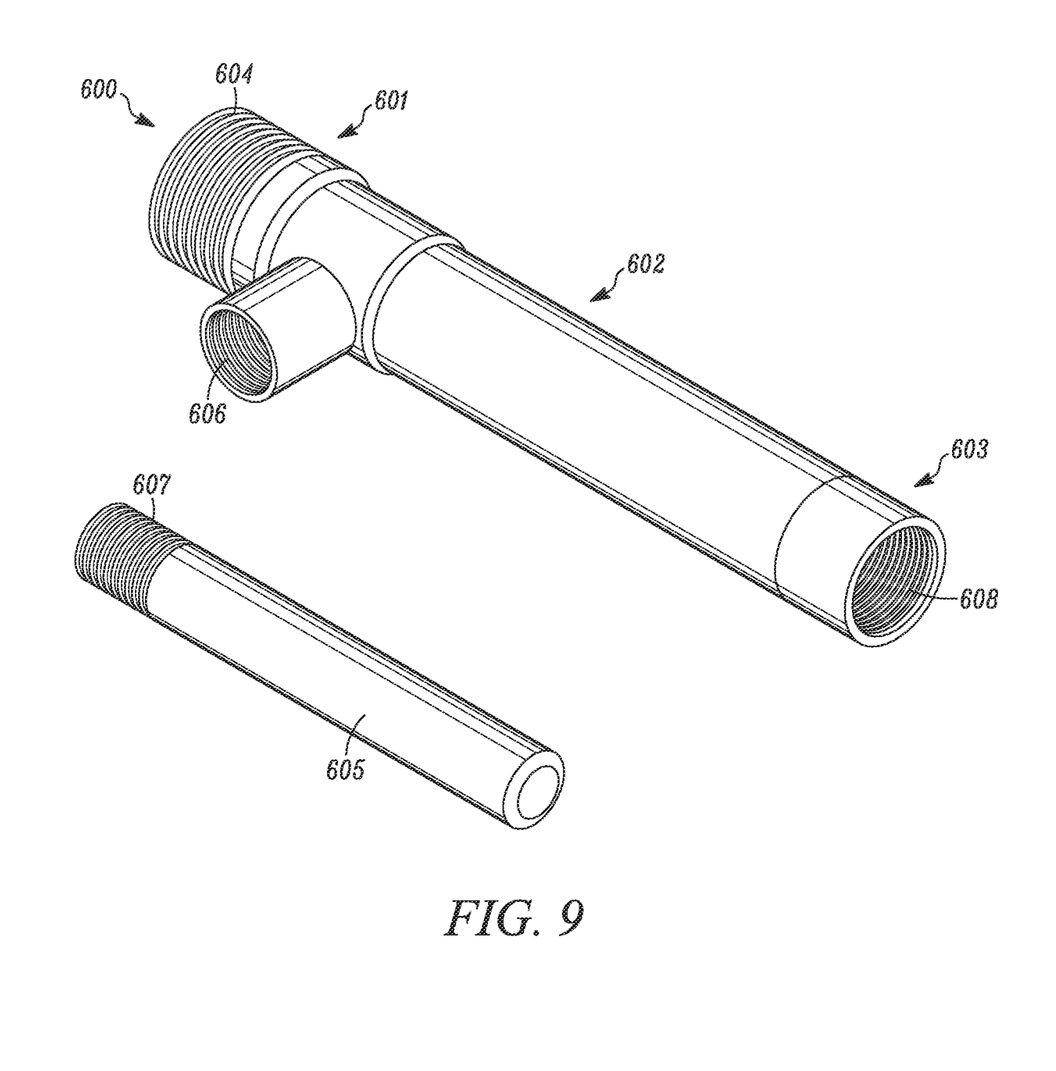
FIG. 9 is a side-view drawing illustrating an exemplary extension member with a detachable handle for coupling with a quick coupler key.

FIGS. 8-9 are various drawings illustrating an exemplary extension member with a detachable handle for coupling with a quick coupler key. The extension member 600 includes a first member 601, a second member 602, a third member 603, a first male thread 604, and a detachable handle 605. The first member 601 has a first male thread 604 and a first female thread (not shown). The first male thread 604 is configured to accept a female thread (not shown) on a pipe coupler 4 in FIG. 1. The first female thread (not shown) is configured to accept a second male thread (not shown) on a pipe 2 in FIG. 1. The second member 602 is adjacent to the second end of the first member 601. The handle 605 is detachably coupled to the second surface of the second member 602. The second surface of the second member 602 has a fourth female thread 606 that accepts the male thread 607 on the handle 605. The third member 603 has a first end, a second end, and a third female thread 608. The first end of the third member 603 is adjacent to the second end of the second member 602. The third female thread 608 is configured to accept a male thread 8 on a quick coupler key 3 in FIG. 2.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single component may meet more than a single functional requirement, provided that the single component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate into this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

What is claimed is:

1. An extension member for coupling with a quick coupler key, the extension member comprising:
    a first member having a first end, a second end, a first male thread on an exterior surface at the first end, and a first female thread on an interior surface at the first end, a first interior diameter, and an axis,
        wherein the first male thread on the exterior surface at the first end is configured to accept a second female thread on a pipe coupler,
        wherein the first female thread on the interior surface at the first end is configured to accept a second male thread on a pipe;
    a second member having a first end, a second end, a first surface, a second surface, a second interior diameter, and the second member is fixed to the first member,
        wherein the first end of the second member is adjacent to the second end of the first member;
    a handle fixed to the second surface of the second member;
    a third member having a first end, a second end, a third female thread on an interior surface at the second end, a third interior diameter, and the third member is fixed to the second member;
        wherein the first end of the third member is adjacent to the second end of the second member; and
        wherein the third female thread on the interior surface at the second end is configured to accept a third male thread on a quick coupler key.

2. The extension member of claim 1, wherein the first interior diameter is greater than the second interior diameter.

3. The extension member of claim 1, wherein the second interior diameter is less than the third interior diameter.

4. The extension member of claim 1, wherein the first interior diameter is greater than the second interior diameter, and wherein the second interior diameter is less than the third interior diameter.

5. An extension member for coupling with a quick coupler key, the extension member comprising:
    a first cylindrical member having a first end, a second end, a first male thread on an exterior surface at the first end, and a first female thread on an interior surface at the first end, a first interior diameter, and an axis,
        wherein the first male thread on the exterior surface at the first end is configured to accept a second female thread on a pipe coupler,
        wherein the first female thread on the interior surface at the first end is configured to accept a second male thread on a pipe:
    a second cylindrical member having a first end, a second end, a first surface, a second surface, a second interior diameter, and the second cylindrical member is fixed to the first cylindrical member;
        wherein the first end of the second cylindrical member is adjacent to the second end of the first cylindrical member;
    a handle fixed to the second surface of the second cylindrical member;
    a third cylindrical member having a first end, a second end, a third female thread on an interior surface at the second end, third interior diameter, and the third cylindrical member is fixed to the second cylindrical member;
        wherein the first end of the third cylindrical member is adjacent to the second end of the second cylindrical member,
        wherein the third female thread on the interior surface at the second end is configured to accept a third male thread on a quick coupler key,
        wherein the first interior diameter is greater than the second interior diameter, and
        wherein the second interior diameter is less than the third interior diameter.

* * * * *